Patented Oct. 13, 1925.

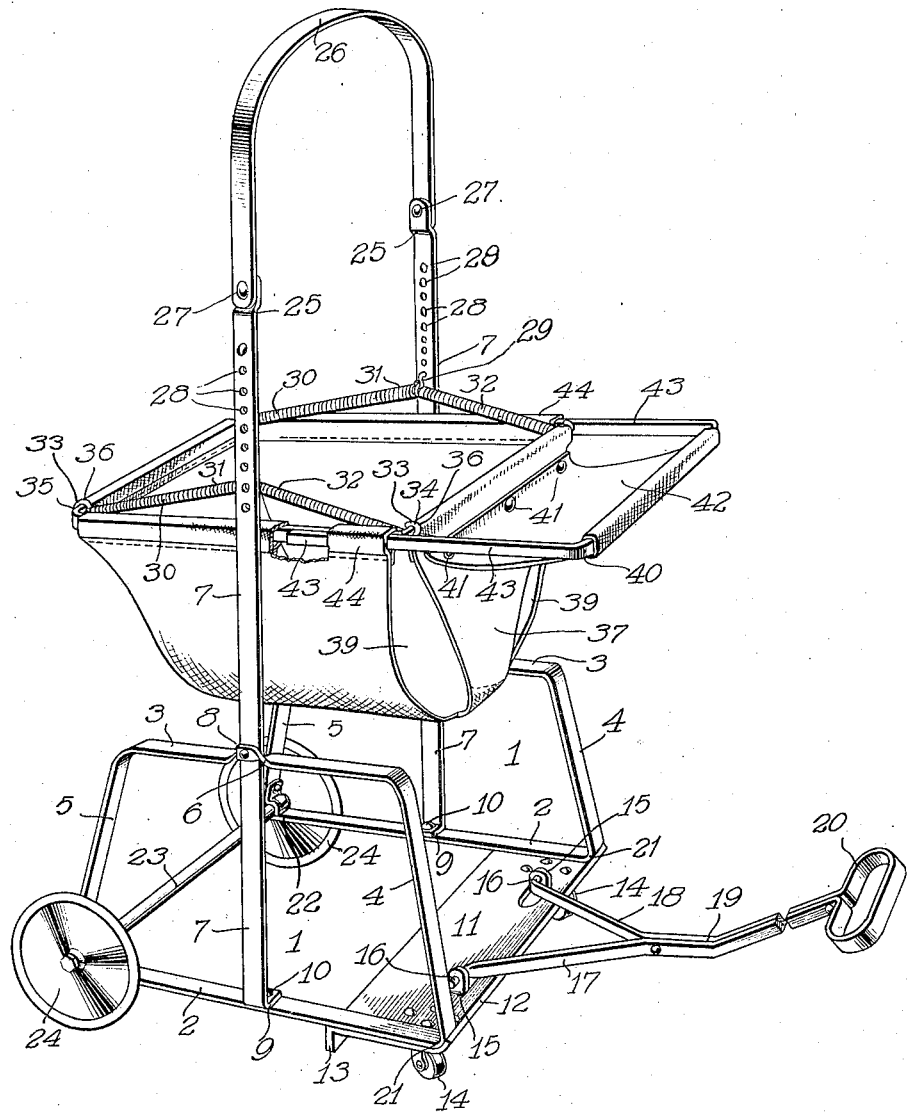

1,557,263

UNITED STATES PATENT OFFICE.

JAMES R. MILLEN, OF FLINT, MICHIGAN.

CHILD'S CART.

Application filed March 10, 1924. Serial No. 698,316.

*To all whom it may concern:*

Be it known that I, JAMES R. MILLEN, a citizen of the United States, residing at Flint, in the county of Genesee and State of Michigan, have invented certain new and useful Improvements in Children's Carts, of which the following is a specification.

This invention relates to certain new and useful improvements in children's carts or carriages, and it has for its objects among others to provide a simplified and cheap, yet durable and efficient child's carriage embodying a jumper seat resiliently supported upon a wheeled member. The seat is supported upon springs which are adjustably dependent from the side uprights and to the latter is pivoted an arched member which serves as a handle and also as a brace for the side members which carry the springs. This arch is raised up when designed for use as a handle and turned down to the front and serves as a convenient means for hanging toys in position to be readily reached by the child in the seat. It may be turned down, preferably to the rear, when the device is in use. The seat is free to swing between the uprights, and the handle by which the cart is pulled is detachably connected with the foot or toe board.

The device is simple in the extreme, is capable of manufacture at small cost, being composed mostly of strap iron, and is very strong and durable.

Other objects and advantages of the invention will hereinafter appear and the novel features thereof will be specifically defined by the appended claims.

The invention, in its preferred form, is clearly illustrated in the accompanying drawing, which, with the numerals of reference marked thereon forms a part of this specification, and in which the figure is a perspective view of a child's cart constructed in accordance with my present invention.

Referring to the drawing—

1 designates the side members each formed of a strip of metal of requisite dimensions and each comprising a bottom member 2, the top member 3, and the front and rear members 4 and 5 respectively. In the present instance the front and rear members 4 and 5 are shown as inclined somewhat from a perpendicular and toward each other to give additional strength and to brace each other, although this is not absolutely necessary. The two members 1 are arranged the desired distance apart and the meeting ends of each strip are given a twist as seen at 6 so that the ends shall be at right angles to the top members and between these ends is received an upright 7, one upon each side of the device, as shown, and the ends of the said uprights are fixedly secured together in some suitable way as by the rivets 8. The lower ends of these uprights are formed with the right angled lugs 9 which are secured to the lower members 2 by suitable means as rivets or the like 10.

11 is a foot or toe board; it is formed of sheet metal and has its front end turned up as seen at 12 and its rear edge turned downwardly at substantially a right angle as seen at 13 so that it will not hurt the child's feet when the device is used as a baby walker. This toe board is mounted on castors or the like 14 of any of the well known types mounted to have swivel movement in the usual way, and from this toe board are struck up the lugs 15 having openings in which are received the lateral projections or pins 16 formed on the free ends of the divergent members 17 and 18 of the tongue 19 having a hand hold 20 by which the cart may be hauled about. The divergent portions 17 and 18 being resilient the free ends can be pressed toward each other to allow of removal and insertion of the pins 16 from the holes in the flanges, or insertion therein. This mode of connecting the handle or tongue permits of ready detachment of the tongue when used in the house, or for other purposes. The forward up-turned edge of the toe board bears against the members 17 and 18 thus supporting the tongue 19 at convenient position, and at the ends bears against the angles 21 of the bottom members, as shown.

At the angles between the members 2 and 5 at the rear there are secured in any suitable manner the members 22 which in conjunction with such angles form bearings for the ends of the rear axle 23 carrying the rear wheels 24 which may be of any suitable kind or make. In the present instance I have chosen to show disk wheels, but other forms may be employed.

The upper ends of the uprights 7 are shown in this instance as inwardly offset as seen at 25 and to these offset ends the lower ends of the arch or yoke 26 are pivoted as seen at 27. This permits the arch to be placed in vertical position to serve as a handle by which the cart may be carried from place to place, and when not in use the arch may be turned down, preferably to the rear so as to be out of the way when the cart is in use or to the front and on which toys may be hung. The offsets serve as stops to limit the downward movement of the arch. A reversal of this arrangement, that is, with the offsets on the handle, would serve equally as well.

The upper ends of the uprights 7 are provided with a plurality of holes 28 in which are received the ends of hooks 29 connected with springs 30 as clearly shown. The springs 30 are each opened at or near the centre forming two members 31 and 32 which are divergent and which have their free ends 33 bent around the front and rear members 34 and 35 of the seat support as seen at 36. This seat support is formed of strap metal in rectangular form as shown.

The seat portion of the device is formed of suitable strong material, such as canvas, of proper depth and the upper edges of which are secured to or around the seat support as seen in the drawing. At the front it is provided with a flap 37 supported at the top from the front member of the seat support, its lower end being an extension of the front edge of the bottom of the seat; this leaves the two openings 39 through which the legs of the child may protrude. This allows plenty of room for the legs of the child.

In some cases I may provide at the front a toy tray, as shown; this is formed of a suitable material, as canvas, folded upon itself, the fold placed around the front bar 40, the one end over the front member of the seat support as shown and the two edges of the tray secured detachably together as by separable fasteners 41, the canvas between the front member of the seat support and the bar 40 forming the tray 42. When it is desired to wash the tray cloth it can be quickly and easily removed.

The tray can be readily removed when desired by disconnecting the cloth, which serves to keep it from being accidentally removed, and then pulling out the side members 43.

The toy tray support has its side members 43 slidably engaged in hems 44 formed in the side portions of the seat cloth as shown. The tray is limited in its outward movement by the connection between the two edges thereof as will be readily understood. When not in use the tray may be moved inward so that it will be out of the way, the cloth thereof folding downward as will be evident. It is shown as extended in the drawing. This toy tray, however, may be omitted when desired and the toys suspended from or attached in any suitable manner to the member 26 when the latter is turned downward horizontally to the front.

In order that the child may raise itself from the seat so as to jump the same up and down, the foot rest is so disposed that a portion of the same extends to a point in vertical alignment, or substantially so, with the front edge of the seat or the seat frame. By this means the child can rise from the seat, and sustain his full weight on the foot rest, and by taking hold of the seat frame, cause the seat to be reciprocated up and down, much to the amusement of the child. With the springs disposed lengthwise of the device and allowing substantially unrestricted vertical and longitudinal swinging movement, ease of movement is provided and the strength of the child is not overtaxed in the use of the device.

The tension of the springs may be regulated and the height of the seat governed by adjustment of the connections 29 with the openings in the uprights.

It will be understood that when it is desired to use the device as a baby walker the arch 26 is turned down to form a means that can be engaged by the hands of the child who remains seated in the seat, but puts his feet upon the floor instead of upon the footboard. When the child is seated in the seat the arch can be turned down at the back to form a back rest for the child if desired.

Modifications in detail may be resorted to without departing from the spirit of the invention or sacrificing any of its advantages.

What is claimed as new is:

1. In a child's cart, side members, each of a continuous piece with the free ends overlapped and twisted to form portions at right angles to the adjacent portions, and uprights secured to the lower portions of said side members and extended between and secured to the said twisted portions.

2. In a child's cart, a support having end portions twisted, uprights secured to the lower members of the support and having portions secured between said twisted ends, and arched means pivotally connected to the upper ends of said uprights.

3. In a device of the character described, a frame having uprights, a resiliently suspended seat frame mounted to swing between the uprights of said frame, a flexible seat carried by the seat frame, and a slidable toy tray cooperable with the seat frame and adjustably mounted.

4. In a child's cart, a resiliently-supported seat frame and seat, a toy tray frame having a sliding connection with said seat frame, and a toy tray engaged over portions of the said frames with its end portions detachably connected together.

5. In a child's cart, a wheeled support, a seat yieldingly suspended thereabove, a toy tray frame slidably connected with the seat frame, and a flexible tray cloth carried by said tray frame and detachably connected with the seat frame to permit separation of the toy frame from the seat frame.

6. In a child's cart or jumper, a frame, a seat frame directly resiliently suspended therein, and having substantially unrestricted vertical and swinging movement therein, a flexible seat suspended from said seat frame and having leg openings, and a foot rest attached to said first-named frame, a portion of the said foot rest being extended to a point in substantially vertical alignment with the front edge of the seat, whereby the occupant of the seat can sustain his full weight on the foot rest and cause the seat to be moved vertically and longitudinally.

7. In a child's cart or jumper, a frame, a seat frame directly resiliently suspended therein for freedom of movement vertically and longitudinally, a flexible seat suspended from said seat frame and having leg openings, and a foot rest attached to said first-named frame and extended to a point in substantially vertical alignment with the front edge of the seat frame, whereby the occupant of the seat can sustain his full weight on the foot rest and cause the seat to be moved vertically and longitudinally practically unrestricted.

In testimony whereof I affix my signature.

JAMES R. MILLEN.